United States Patent
Smith et al.

(10) Patent No.: US 8,081,319 B2
(45) Date of Patent: Dec. 20, 2011

(54) ADJUSTABLE TWO DIMENSIONAL LAMELLAR GRATING

(75) Inventors: Malcolm C. Smith, Winchester, MA (US); Michael A. Butler, Windham, NH (US); Erik Deutsch, Brookline, MA (US)

(73) Assignee: Ahura Scientific Inc., Wilmington, MA (US)

( * ) Notice: Subject to any disclaimer, the term of this patent is extended or adjusted under 35 U.S.C. 154(b) by 375 days.

(21) Appl. No.: 12/483,653

(22) Filed: Jun. 12, 2009

(65) Prior Publication Data

US 2009/0257063 A1    Oct. 15, 2009

Related U.S. Application Data

(60) Provisional application No. 61/060,922, filed on Jun. 12, 2008.

(51) Int. Cl.
*G01B 9/02*       (2006.01)
*G02B 26/08*      (2006.01)
*G02B 26/10*      (2006.01)
*G02B 26/12*      (2006.01)
*G02B 5/18*       (2006.01)
*G02B 27/44*      (2006.01)

(52) U.S. Cl. ........... 356/521; 359/223.1; 359/566

(58) Field of Classification Search ........... 356/451, 356/521; 359/223.1, 566, 569, 572, 576, 359/577, 580, 583
See application file for complete search history.

(56) References Cited

U.S. PATENT DOCUMENTS

| 6,781,701 B1 * | 8/2004 | Sweetser et al. ............ 356/521 |
| 2007/0146720 A1 * | 6/2007 | Cox et al. .................. 356/451 |
| 2007/0159635 A1 | 7/2007 | Urey et al. |
| 2008/0204879 A1 * | 8/2008 | Manzardo et al. ............ 359/566 |
| 2009/0279172 A1 * | 11/2009 | Higashi .................... 359/566 |

OTHER PUBLICATIONS

Manzardo, O. et al., "Minature Lamellar grating Interferometer Based on Silicon Technology", Opt. Lett, 29, 1437 (2004).
Strong, J. et al., "Lamellar Grating Far-Infrared Interferometer," J. Opt. Soc. Am. 50, 113 (1960).
Manzardo, Omar et al., "Infra-Red MEMS-Based Lamellar Grating Spectrometer," 2004, SPIE Proceedings, vol. 5455, pp. 1-8.

* cited by examiner

*Primary Examiner* — Michael A Lyons
(74) *Attorney, Agent, or Firm* — Lando & Anastasi, LLP

(57) ABSTRACT

An adjustable two-dimensional lamellar grating system including a lamellar grating and a movable mirror disposed substantially parallel to one another, and an interferometer using the adjustable lamellar grating system. In one example, the lamellar grating includes a dielectric wafer having a dielectric wafer having a plurality of periodically spaced recesses formed therein, wherein the dielectric wafer has higher reflectivity at its surface facing the movable mirror than at a second opposing surface. In one example, the system also includes a mechanism for moving the mirror relative to the dielectric wafer.

23 Claims, 7 Drawing Sheets

ADJUSTABLE TWO DIMENSIONAL LAMELLAR GRATING

CROSS-REFERENCE TO RELATED APPLICATIONS

The present application claims priority under 35 U.S.C. §119(e) to U.S. Provisional Application No. 61/060,922, entitled "ADJUSTABLE TWO DIMENSIONAL LAMELLAR GRATING" filed on Jun. 12, 2008, which is herein incorporated by reference in its entirety.

BACKGROUND

1. Field of Invention

The present invention relates generally to spectrometers and interferometers and, more particularly, to lamellar gratings used in spectrometers and/or interferometers.

2. Discussion of Related Art

Spectrometers require components to generate light, disperse the light, and detect the light. To disperse the light there are two common approaches; (1) using a fixed grating to separate the wavelengths by diffraction and (2) using an interferometer to select wavelengths using an interferometric filter. Each approach has its own advantages and drawbacks. The grating dispersion spectrometer requires an input slit, which limits the resolution or throughput of the spectrometer. Narrower slits give higher resolution and lower throughput, while wider slits give lower resolution and higher throughput. It is well known that for a given size of optics, an interferometer-based spectrometer can have better signal-to-noise than a scanning-grating spectrometer, due to the throughput (or Jacquinot) and multiplex (or Fellget) advantages offered by interferometer-based spectrometers. The throughput advantage comes from a larger input optic (because there is no slit) and the multiplex advantage comes from measuring many wavelengths at one time.

The interferometer-based spectrometer characteristics depend on the interferometer dimensions and thus its free spectral range. For an interferometric filter operating in its fundamental mode with maximum free spectral range, the throughput is large because there is no slit to limit the amount of light entering the instrument. However, since only one wavelength is passed through the interferometric filter at any one time, it does not have a multiplexing advantage. Conventional Fourier transform spectrometers with large optical cavities pass many wavelengths at any one time and thus offer throughput advantages from not having a slit as well as a multiplexing advantage from passing many wavelength of light at any one time. In addition, Fourier transform spectrometers also have the advantage of a built-in internal wavelength reference, typically a He—Ne laser. These advantages have made the Fourier transform Spectrometer the laboratory instrument of choice in the infrared region of the spectrum. However, interferometers with large optical paths generally require large rigid structure to maintain the stability necessary to function properly. This makes the instruments large, heavy, and sensitive to environmental factors such as temperature fluctuations and mechanical vibrations. They are not well suited to building hand-held spectrometers.

These limitations arise primarily from the fact that Fourier transform spectrometers use Michelson interferometers in which the optical paths are at right angles, as shown in FIG. 1. Referring to FIG. 1, in a Michelson interferometer, incident light from an input 102 is split by a semi-transparent mirror 114 into two paths 104 (Path 1) and 106 (Path 2), thus providing two paths from the light source at the input 102 to the detector at the output 108. Light in the first path 104 reflects off the semi-transparent mirror 114, goes to the top mirror 110, is reflected back, and passes through the semi-transparent mirror, to the output 108. In the second path 106, the light passes through the semi-transparent mirror 114 to the mirror 112 on the right, reflects back to the semi-transparent mirror, then reflects from the semi-transparent mirror into the output 108. These two separate paths 104, 106 for the light beams that interfere make for critical alignment and sensitivity to environmental factors.

Another type of interferometer including a lamellar grating is shown in FIG. 2. The lamellar grating interferometer comprises a reflective lamellar grating system 202 in which half the mirror elements 202a are movable, as illustrated in FIG. 2. The mirror elements also include a reflective surface 204. In this type of interferometer the two optical paths 104, 106 for the interfering beams are almost identical. This greatly reduces the criticality of the alignment and the sensitivity to environmental factors. Such interferometers have been used in Fourier Transform spectrometers for the far-infrared and Terahertz region of the spectrum, as disclosed in a paper by J. Strong and G. A. Vanasse entitled "Lamellar grating far-infrared interferometer," published at J. Opt. Soc. Am. 50, 113 (1960). For such long wavelengths, the lamellar grating structure can be fabricated with conventional machining techniques. However, as the wavelength gets shorter (the mid and near infrared) such conventional fabrication techniques can no longer make the small components and achieve the necessary tolerances.

Recently microelectromechanical processes (MEMs) or micro-fabrication, which use silicon micromachining techniques, have been used to build a visible/near infrared spectrometer based on the lamellar interferometer configuration of FIG. 2, as disclosed in a paper by O. Manzardo, R. Michaely, F. Schddelin, W. Noell, T. Overstolz, N. De Rooij, and H. P. Herzig, entitled "Miniature lamellar grating interferometer based on silicon technology," published at Opt. Lett, 29, 1437 (2004). This paper is referred to herein as Reference 2, and is herein incorporated by reference. Similarly, a lamellar grating interferometer used as a Fourier transform spectrometer based on a diffraction grating operating in the zeroth order is disclosed in U.S. Patent Pub. No. 2007-0159635 filed Jan. 12, 2006 and entitled "Fourier transform spectrometer." Such a spectrometer is now available commercially from ArcOptix (www.arcoptix.com). Such micro-fabrication techniques are capable of achieving the desired precision and small dimensions for lamellar grating interferometers in the visible and near infrared part of the spectrum, but are limited in the size of the grating that can be fabricated by these techniques.

The throughput (or Jacquinot) advantage of Michelson interferometers comes from the much larger optical beam diameter that can be achieved compared to a dispersive instrument, which is limited by the area of its slit. For example, a typical dispersive instrument may have a slit that is about 5 millimeters (mm) high and about 0.1 mm wide for a total area of 0.5 $mm^2$. By contrast, a Michelson interferometer of comparable size and resolution may have a beam diameter of about 20 mm, or an area of 314 $mm^2$. This large difference in area is a primary reason why Fourier transform interferometers (using Michelson interferometers) have become the laboratory standard for the mid-infrared region where light sources and detectors perform relatively poorly.

Lamellar grating interferometers also possess the throughput advantage. However, the micro-fabrication technology described above is limited in its ability to produce lamellar gratings with large cross sectional areas. The instrument described in Reference 2 has a lamellar grating that is 0.075 mm high by 3.2 mm long, thus having a total cross sectional area of 0.24 mm². The planar silicon surface micromachining used to produce this grating makes it is difficult to build structures perpendicular to the planar surface that are significantly higher than the 0.075 mm reported in Reference 2.

SUMMARY OF INVENTION

Aspects and embodiments are directed to an adjustable lamellar grating system and an interferometer using the adjustable lamellar grating system. In one embodiment, an adjustable lamellar grating system comprises a dielectric wafer having a plurality of periodically spaced recesses formed therein, a movable mirror aligned substantially parallel with the dielectric wafer, and a mechanism for moving the mirror relative to the dielectric wafer, wherein the dielectric wafer has a first surface facing the movable mirror and a second, opposing surface, and wherein the dielectric wafer has higher reflectivity at the first surface facing the movable mirror than at the second surface. In one example, the plurality of recesses comprises a plurality of through holes extending from the first surface to the second surface. In another example, the plurality of recesses comprises a plurality of wells formed in the first surface. The dielectric wafer may comprise, for example, a silicon wafer. In one example, an anti-reflection coating is disposed on the second surface. In another example, a reflective layer is disposed on the first surface. The reflective layer may comprise, for example, a metal layer. In another example, the mechanism for moving the mirror relative to the dielectric wafer includes a mirror driver unit configured to move the mirror through a range of positions relative to the dielectric wafer.

According to another embodiment, an interferometer comprises a lamellar grating including a dielectric wafer having a plurality of periodically spaced recesses formed therein, a movable mirror aligned substantially parallel with the dielectric wafer, an input aperture configured to pass incident light to the lamellar grating, a detector configured to receive output light from the lamellar grating, and a mirror drive unit configured to move the movable mirror relative to the dielectric wafer. The interferometer may further comprise a beam splitter disposed between the input aperture and the lamellar grating, the beam splitter configured to pass the incident light from the input aperture to the lamellar grating and to reflect the output light from the lamellar grating to the detector. In one example, the plurality of recesses comprises a plurality of through holes extending through the dielectric wafer. In another example, the plurality of recesses comprises a plurality of wells formed in a surface of the dielectric wafer. In another example, the dielectric wafer has higher reflectivity at a first surface facing the movable mirror than at a second, opposing and substantially parallel surface. The dielectric wafer may further comprise a reflective layer disposed on the first surface. The dielectric wafer may further comprise an anti-reflection coating disposed on the second surface. In one example, the interferometer further comprises a lens disposed between the beam splitter and the lamellar grating. The mirror drive unit may be configured to scan a position of the movable mirror through a range of positions relative to the dielectric wafer, and the interferometer may further comprise a control and data acquisition module configured to measure an output from the detector.

Another embodiment of an interferometer comprises an adjustable lamellar grating system including a dielectric wafer having a first surface, a second surface a plurality of periodically spaced holes formed therein between the first surface and the second surface, a movable mirror aligned substantially parallel with the first surface of the dielectric wafer, a reflective layer disposed on the first surface of the dielectric wafer facing the movable mirror, and a mirror drive unit configured to move the movable mirror with respect to the dielectric wafer. The interferometer further comprises an input aperture, a beam splitter located between the input aperture and the second surface of the adjustable lamellar grating, a lens located between the beam splitter and the second surface of the adjustable lamellar grating, the lens and beam splitter configured to direct a collimated beam of light toward the second surface of the adjustable lamellar grating, and a detector. The interferometer comprises a first optical path and a second optical path, wherein light traveling on the first optical path passes from the lens toward the second surface and through at least some of the plurality of periodically spaced holes in the dielectric wafer, reflects off the movable mirror, returns toward the first surface and through the at least some of the plurality of periodically spaced holes in the dielectric wafer and the lens, and is reflected off the beam splitter to the detector, and wherein light traveling on the second optical path passes from the lens toward the second surface and through the dielectric wafer, reflects off the reflective layer, returns through the dielectric wafer and the lens, and is reflected off the beam splitter to the detector.

According to another embodiment, an adjustable lamellar grating system comprises a movable mirror, a first dielectric wafer having a first surface, a second surface and a plurality of periodically spaced holes extending from the first surface to the second surface, the first dielectric wafer aligned substantially parallel with the movable mirror with the first surface facing the movable mirror, a mechanism configured to move the movable mirror relative to the dielectric wafer, and a reflective layer disposed on the first surface of the first dielectric wafer. In one example, the adjustable lamellar grating system further comprises a second dielectric wafer bonded to the second surface of the first dielectric wafer. The second dielectric wafer may comprise third and fourth substantially parallel surfaces, the third surface bonded to the second surface of the first dielectric wafer. The second dielectric wafer may further comprise an anti-reflection coating disposed on the fourth surface. In another example, the adjustable lamellar grating system further comprises an anti-reflection coating disposed on the second surface of the first dielectric wafer. The first dielectric wafer may comprise, for example, a silicon wafer.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF THE DRAWINGS

Various aspects of at least one embodiment are discussed below with reference to the accompanying figures. In the figures, which are not intended to be drawn to scale, each identical or nearly identical component that is illustrated in various figures is represented by a like numeral. For purposes of clarity, not every component may be labeled in every drawing. The figures are provided for the purposes of illustration and explanation and are not intended as a definition of the limits of the invention. In the figures.

DETAILED DESCRIPTION

To address the problems associated with conventional interferometers discussed above, aspects and embodiments are directed to an adjustable, two-dimensional lamellar grating system that may be used in a lamellar interferometer/spectrometer. As discussed further below, the grating may be formed using micromachining techniques, but in such a way that enables the making of large area lamellar gratings.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments. Any references to front and back, left and right, top and bottom, and upper and lower are intended for convenience of description, not to limit the present systems and methods or their components to any one positional or spatial orientation. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items.

Figure 3A:
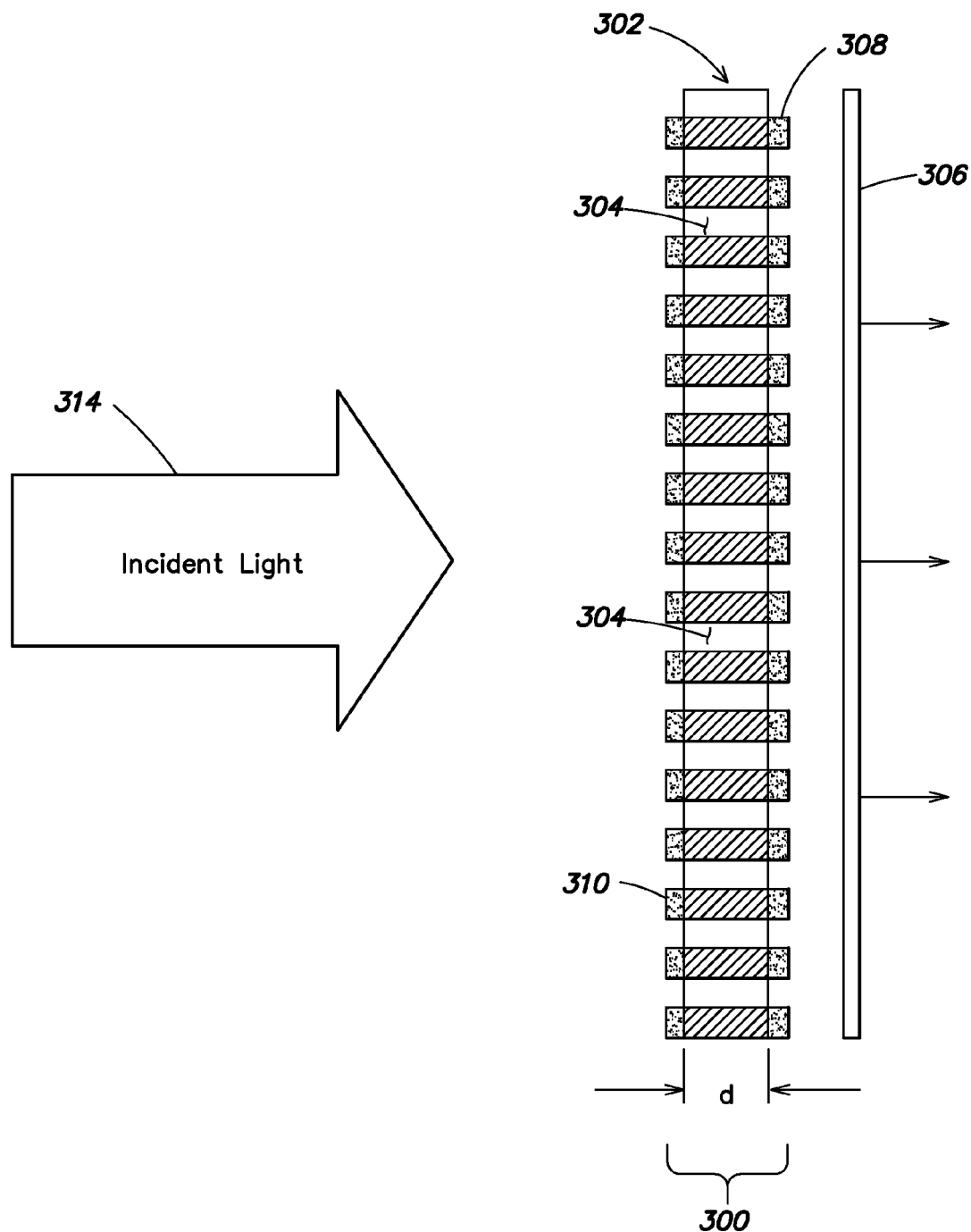
FIG. 3A is a diagram of one example of a two-dimensional adjustable lamellar grating system according to aspects of the invention.

Referring to FIG. 3A, there is illustrated one example of a two-dimensional lamellar grating system according to aspects of the invention. In one example, a lamellar grating is a grating with ridges of rectangular cross section, generally equal in width to the space between. In the example illustrated in FIG. 3A, the lamellar grating 300 comprises a dielectric wafer 302 with periodically spaced through-holes 304. The lamellar grating system further comprises a movable mirror 306 aligned substantially parallel to the dielectric wafer 302. The system is made adjustable by a mechanism (for example, the mirror drive unit shown in FIG. 5) for moving the mirror relative to the dielectric wafer. In one example, the moveable mirror 306 may be moved closer to and further away from the dielectric wafer 302, while maintaining a substantially parallel relationship between the movable mirror and the dielectric wafer. The dielectric wafer 302 has a thickness d. In another example, illustrated in FIG. 3B, the dielectric wafer 302 may comprise a plurality of wells 312 formed therein, rather than the through holes 304 shown in FIG. 3B. As used herein, the term "well" refers to a hole that does not extend all the way through the wafer 302. According to one embodiment, the dielectric wafer 302 has a higher reflectivity at the surface facing the movable mirror 306 than at its other, opposing surface. In one example, the dielectric wafer 302 comprises silicon, and the surface facing the moving mirror is coated with a reflective layer 308, such as a reflective metal. The opposing surface of the dielectric wafer 302 may be coated with an anti-reflection coating 310, as shown in FIGS. 3A and 3B.

Figure 3B:
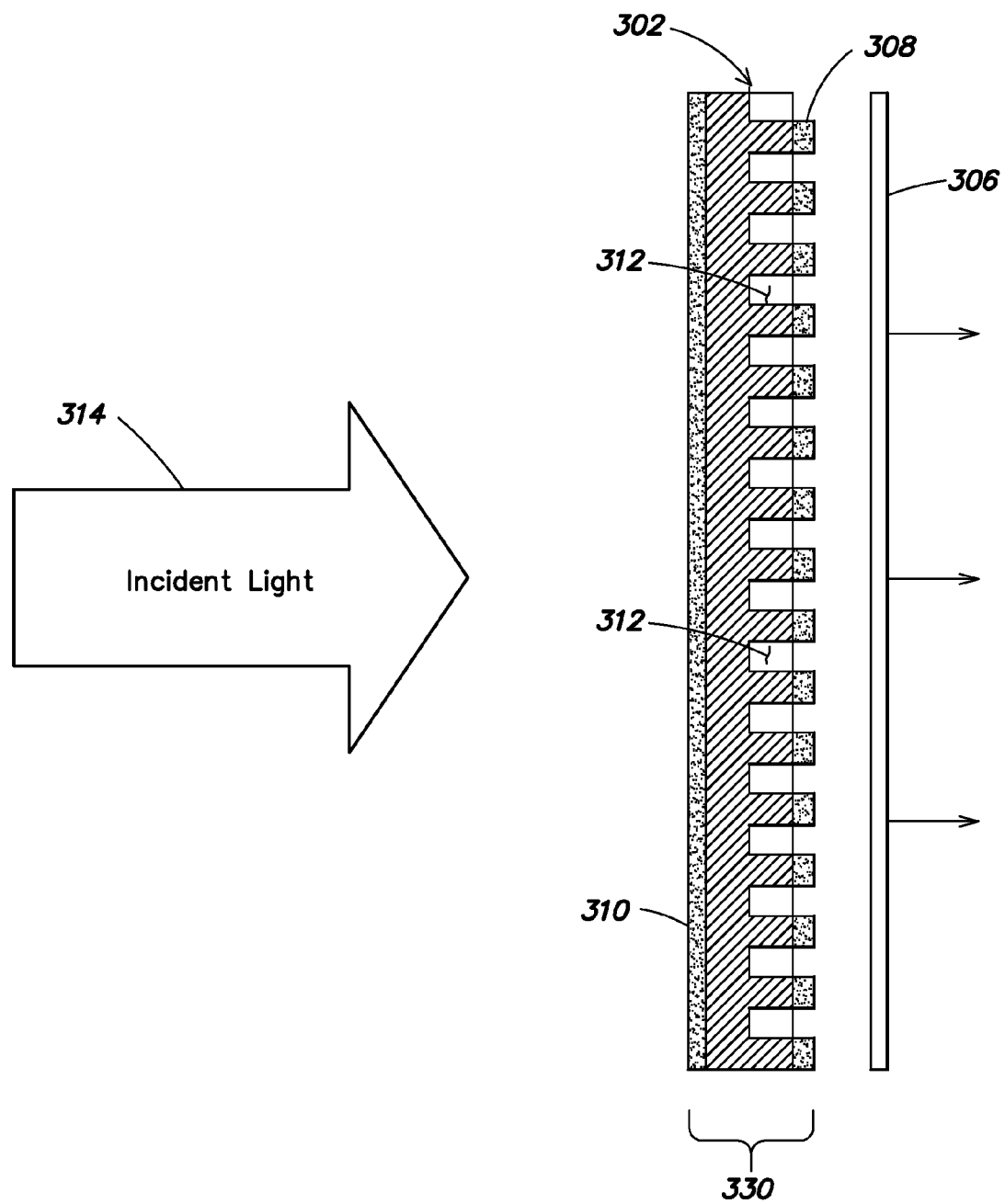
FIG. 3B is a diagram of another example of a two-dimensional adjustable lamellar grating system according to aspects of the invention.

The lamellar grating system illustrated in FIGS. 3A and 3B is a mechanically simpler structure to build compared to the conventional structures discussed above because the reflective parts of the lamellar interferometer are separated for the two different optical paths. As a result, there is less need for concern about the lateral alignment of one part with the other. In addition, a large optical beam diameter can be maintained because the micro-fabrication processes to form the structure are used in the plane of the wafer rather than perpendicular to the plane of the wafer as in Reference 2.

Figure 4A:
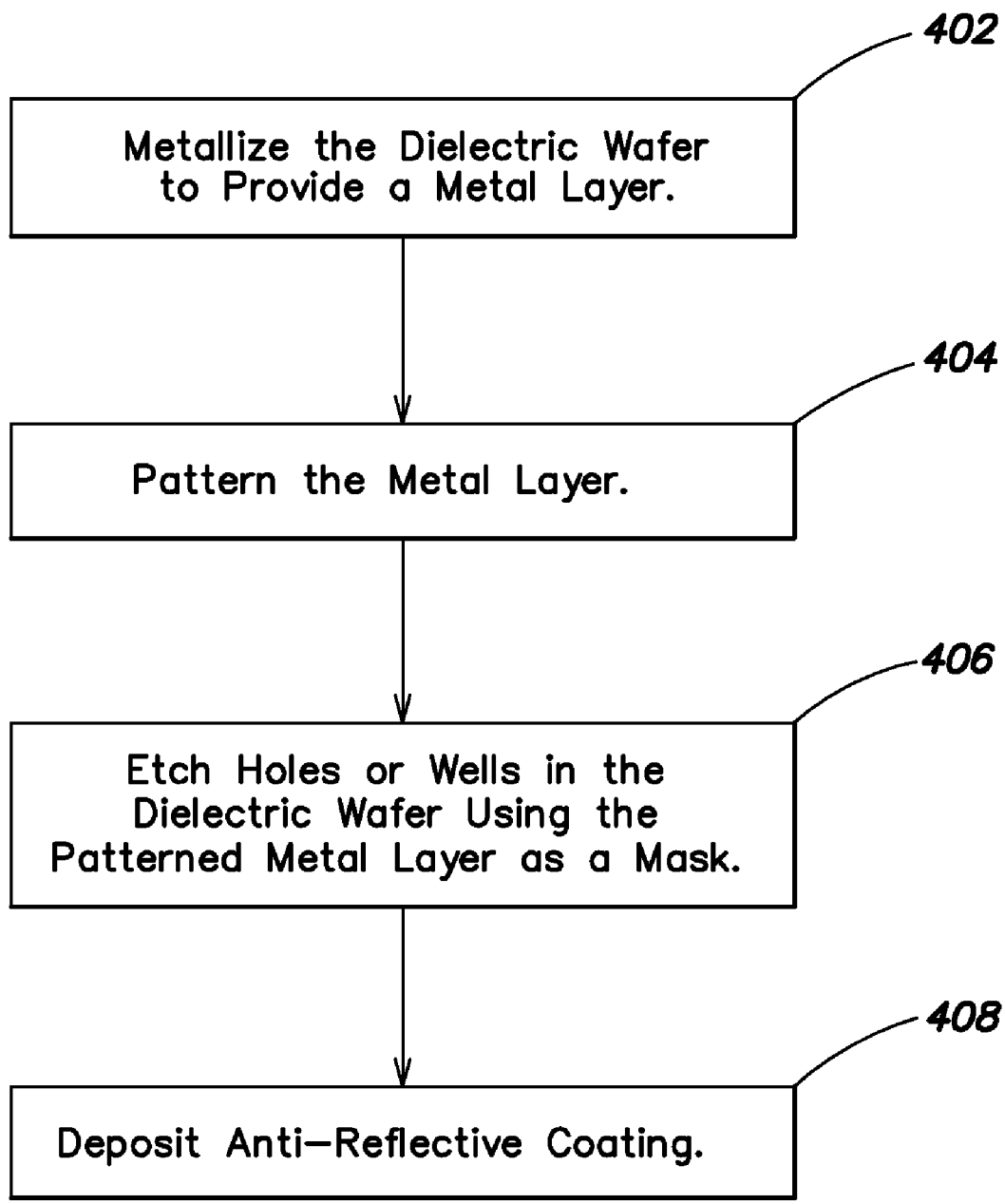
FIG. 4A is a flow diagram of one example of a method of producing a lamellar grating according to aspects of the invention.

As discussed above, in one embodiment, the dielectric wafer comprises a silicon wafer. Silicon wafers with the presently preferred degree of thickness uniformity and flatness presently can be purchased, for example, from Light Machinery, 272 Spring Street Almonte, Ontario Canada K0A 1A0. Referring to FIG. 4A, in one embodiment, example micromachining steps to fabricate the lamellar grating include metalizing the dielectric wafer 302 (step 402) to provide the metal layer 308, and patterning the metal layer (step 404). The metal layer may then be used as a hard mask for etching the holes 304 or wells 312 through or into the silicon (step 406). In one example, the holes 304 or wells 312 are etched as a periodic array. There are numerous etching processes known to those skilled in the art, any of which may be used provided that the depth of the wells can be made the same across the wafer, and that the bottoms of the wells are optically smooth. Furthermore, processes other than etching, such as milling, ion beam milling, etc. may also be used to form the hole 304 or wells 312. In step 408, the anti-reflection coating may be deposited on the side of the dielectric wafer 302 opposite from the metal layer 308.

Figure 1:
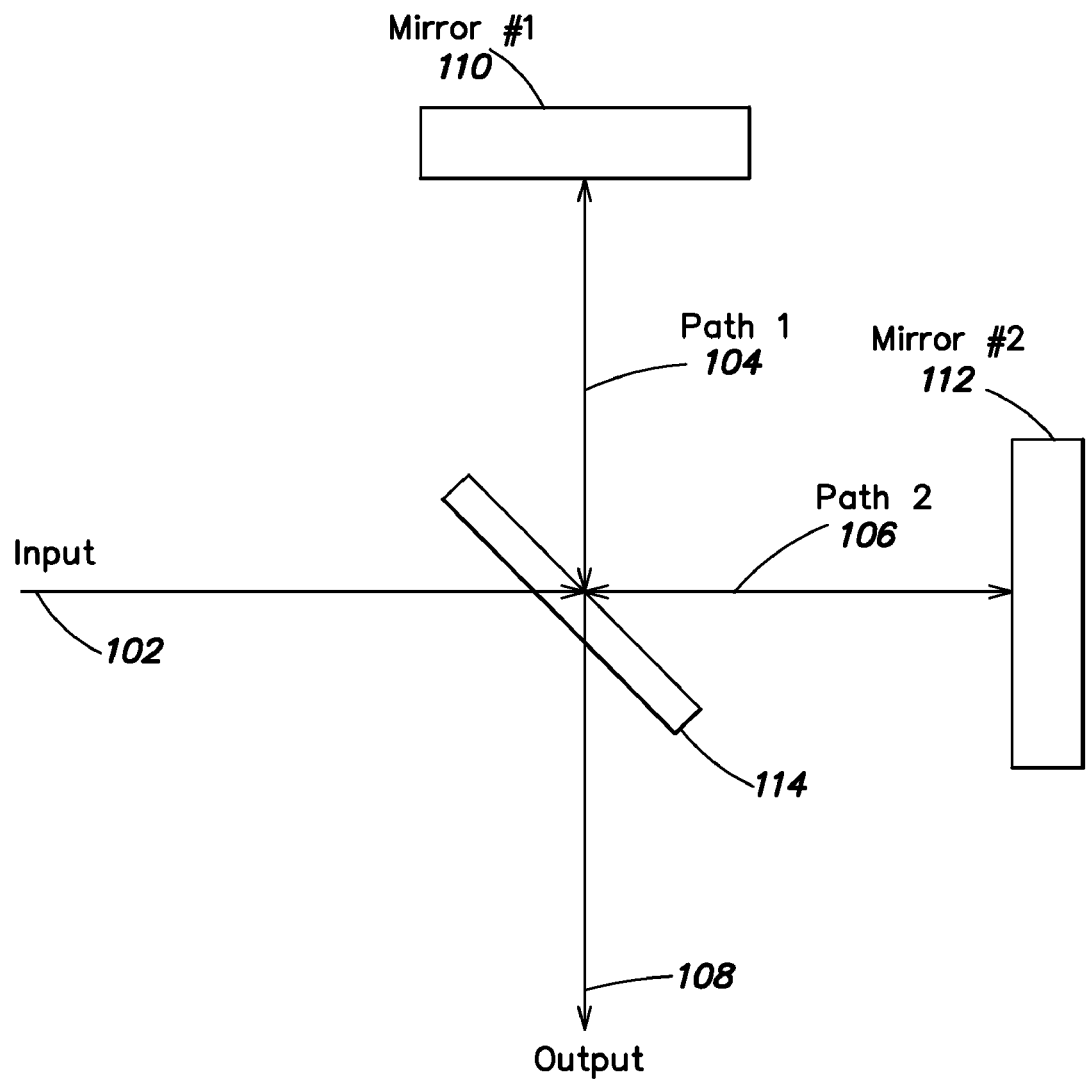
FIG. 1 is a diagram illustrating one example of optical configuration for a Michelson interferometer.
Figure 2:
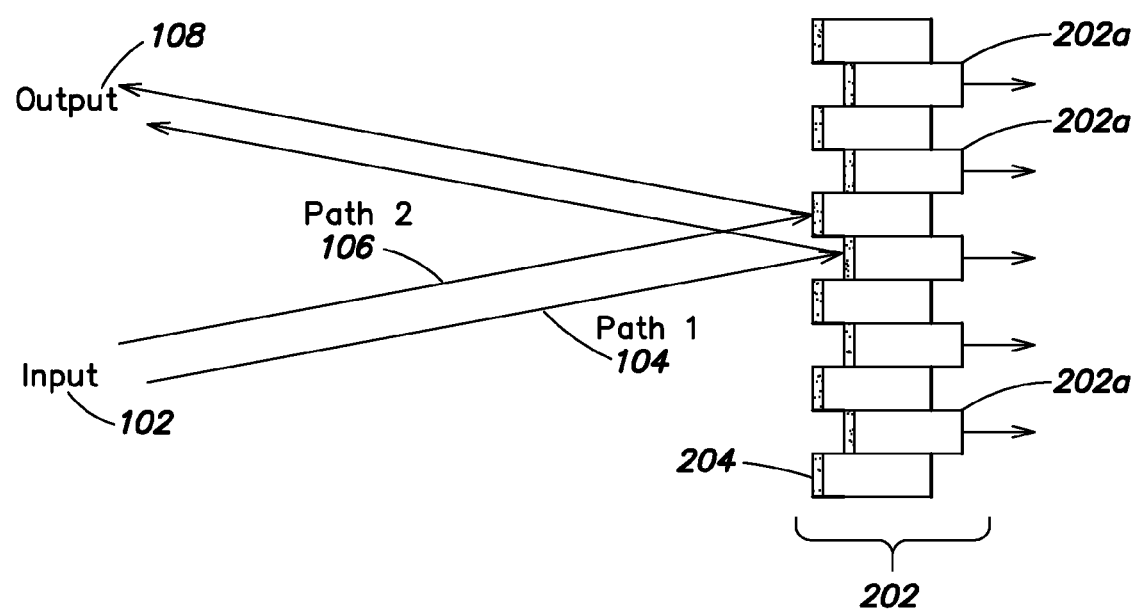
FIG. 2 is a diagram illustrating one example of optical configuration for a lamellar grating interferometer.
Figure 4B:
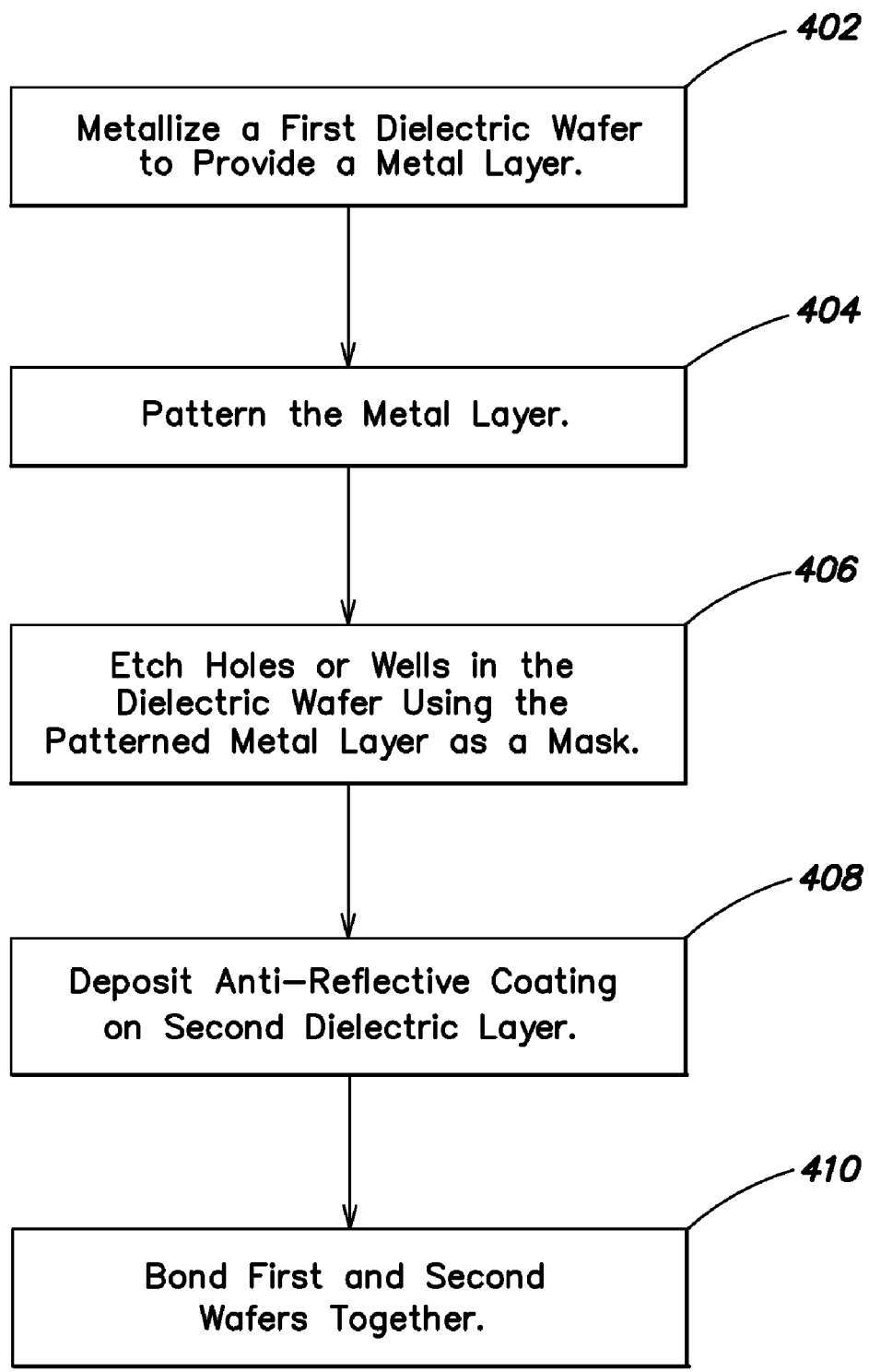
FIG. 4B is a flow diagram of another example of a method of producing a lamellar grating according to aspects of the invention.

Referring to FIG. 4B, there is illustrated an alternative fabrication process for forming the lamellar grating 330 shown in FIG. 3B. In this example, the lamellar grating may be fabricated using two silicon wafers. The first silicon wafer may be metalized, patterned and etched to form the wells 312 (steps 402, 404 and 406), as discussed above. The second wafer may be coated with the anti-reflection coating on one side (step 408) and bonded to the first silicon wafer (step 410) using processes known to one skilled in the art. An example of the resulting structure is shown in FIG. 3B. From an optical point of view, the configuration illustrated in FIG. 3B functions in a substantially identical manner to the configuration illustrated in FIG. 3A. The difference between the two optical paths 104, 106 (see FIG. 2) is not affected by the second wafer without holes/wells, since the second wafer has the same thickness in both paths.

Referring again to FIG. 3A, light 314 incident from the left can follow one of two paths, given that the mirror 306 is disposed substantially parallel to the dielectric wafer 302. In the first path, the light 314 passes through the holes 304 in the dielectric wafer 302 and reflects off of the moving mirror 306 behind. The light then travels back through the holes 304. In the second path, the light travels through the anti-reflection (AR) coating 310, through the dielectric wafer 302, and reflects off of the mirror 306 at the backside of the dielectric. The light then travels back through the dielectric wafer 302 and the AR coating 310. The path-length difference between the two optical paths is given by the following expression:

$$\text{Path-length difference} = 2dn - 2(d+x) = 2d(n-1) - 2x \quad (1)$$

where x is the distance from the backside of the dielectric wafer 302 to the moving mirror 306, d is the thickness of the dielectric wafer 302, and n is the index of refraction of the dielectric. The fact that the index of refraction of the dielectric layer is greater than one enables the zero path of the interferometer, when $x=d(n-1)$, to be between the dielectric wafer 302 and the movable mirror 306.

In one embodiment, silicon is chosen as the wafer material because it is transparent in the near and mid-infrared region of the spectrum and micro-fabrication techniques for silicon are well developed. However, it is to be appreciated that other materials that meet the optical requirements could also be used. Since silicon has a large index of refraction, it is presently desirable to use an anti-reflection (AR) coating 310 on the front surface of the wafer, as shown in FIGS. 3A and 3B. There are a variety of suitable materials that may be used for the anti-reflection coating 310, as will be recognized by those skilled in the art. It is to be appreciated that there are also circumstances in which the anti-reflection coating 310 may not be needed, such as, for example, if a material other than silicon and having a smaller index of refraction is used for the dielectric wafer 302. Accordingly, embodiments of the invention do not require the anti-reflection coating 310. In one example, performance benefits are achieved if the side of the dielectric wafer 302 facing the moving mirror 306 is covered with a highly reflective layer 308. It is to be appreciated that the term "reflective layer" as used herein is intended to include materials that are at least partially reflecting and therefore, the material may be, but is not required to be, 100% reflecting of the incident light. Gold and aluminum are examples of suitable metals that may be used for the reflective layer 308. However, it is to be appreciated that the use of a reflective layer 308 is not required.

Still referring to FIGS. 3A and 3B, the holes 304 or wells 312 may be of any shape, but the size and spacing of the holes or wells in the dielectric wafer 302 will affect performance. It is to be appreciated that although, for simplicity, the following discussion will refer primarily to the holes 304; the discussion applies equally to the wells 312. In one example, optimum, or nearly optimum, performance is obtained if the holes 304 cover approximately half of the wafer area. The spacing of the holes 304 may be periodic, to create the diffraction of light at well-defined angles. In one example, choosing a square grid array of round holes, and assuming a hole-diameter of D and a hole-spacing of s, then the following relationship holds if the hole coverage is half the wafer area:

$$\left(\frac{\pi}{4}\right)D^2 = \frac{s^2}{2} \quad (2)$$

This expression reduces to approximately D/s=0.8. Other configurations of holes, such as, for example, a hexagonal grid of round holes, may be used as well. Of course, with hole array configurations that are not square, the relationship between the hole diameter and hole spacing would be different. Similarly, a series of elongated holes or stripes may be used, in which case, in one example, the width of the stripes to spacing ratio may be equal to approximately 0.5 for optimum (or near optimum) performance.

In one embodiment of the grating structure, the spacing of the holes and the wavelength of the incident light determine the angle at which the light is diffracted. For normal incidence:

$$m\lambda = s \cdot \sin\theta \quad (3)$$

where m is the diffraction order and θ is the diffraction angle. In one example, the diffraction angle is important since only the zero order light is typically used in a lamellar grating interferometer. In some instances, the diffracted light, in all diffracted orders, needs to be excluded from the optical path. This may be conveniently done with an input aperture and an aperture on the detector of the interferometer. The displacement of the first-order diffracted light at the detector is given by:

$$\text{Displacement} = \theta * F = \frac{\lambda F}{s} \quad (4)$$

where F is the focal length of the lens coupling the light into the detector. For a wavelength of 3 microns (μm), a hole spacing of 125 microns and a focal length of 50 mm, the diffracted light is displaced by 1.2 mm at the detector. This displacement is within reasonable tolerance for use with a one mm diameter detector.

Another aspect of the dielectric wafer 302 which may be considered and varied depending on application is the thickness, d, of the dielectric wafer. The thickness of the dielectric wafer 302 depends on the operating parameters desired for the lamellar grating interferometer. If the interferometer is used as a Fourier transform spectrometer, then the travel of the reflecting mirror determines the resolution of the spectrometer according to the following equation:

$$\Delta v = \frac{1}{\Delta y} \quad (5)$$

where Δy is the change in optical path length or twice the travel of the moving mirror. The units for 1/Δy are centimeters (cm) and the units for Δv are inverse cm (cm⁻¹). If the mirror travel about the zero path point of the interferometer is required to be symmetrical, the maximum travel, from equation (1), will be:

$$2x = 2d(n-1)$$

Therefore, thicker dielectric wafers (i.e., greater d) will give longer mirror-travel. In one example, for a 200 micron thick silicon wafer, the mirror travel is 1 mm, which corresponds to a resolution for the spectrometer of 5 cm⁻¹.

Another factor that can influence the choice of wafer thickness is surface stress induced curvature of the wafer caused by deposition of the anti-reflection coating and the reflective layer. If significant curvature of the wafer occurs, the space between the moving mirror and the wafer varies which may wash out the interference fringes and adversely affect performance of the interferometer. Accordingly, in one example, the process of applying the anti-reflection coating and reflective metal layer are optimized to minimize wafer curvature. In addition, a stress compensation layer may be deposited over the reflective metal layer.

An example of an adjustable two-dimensional lamellar grating system was designed for use in an interferometer/spectrometer. In this example, desired operating parameters included a spectral range of 1000 to 4000 $cm^{-1}$ (2.5 to 10 microns) and a resolution of 4 $cm^{-1}$. For a silicon wafer this resolution corresponds to a change in optical path of 2.5 mm or a total travel for the moving mirror of 1.25 mm. This can be achieved with a silicon wafer having a thickness of 300 microns as this thickness provides a maximum travel of 1.5 mm for a symmetrically scanned moving mirror. Assuming a focal length of 50 mm for the optics directing the light onto a 1 mm diameter detector, the minimum offset of the diffracted light at the detector will be 1 mm for a hole-spacing in the silicon wafer of 125 microns. An adjustable two-dimensional lamellar grating system having these parameters can be fabricated using the techniques discussed above.

Figure 5:
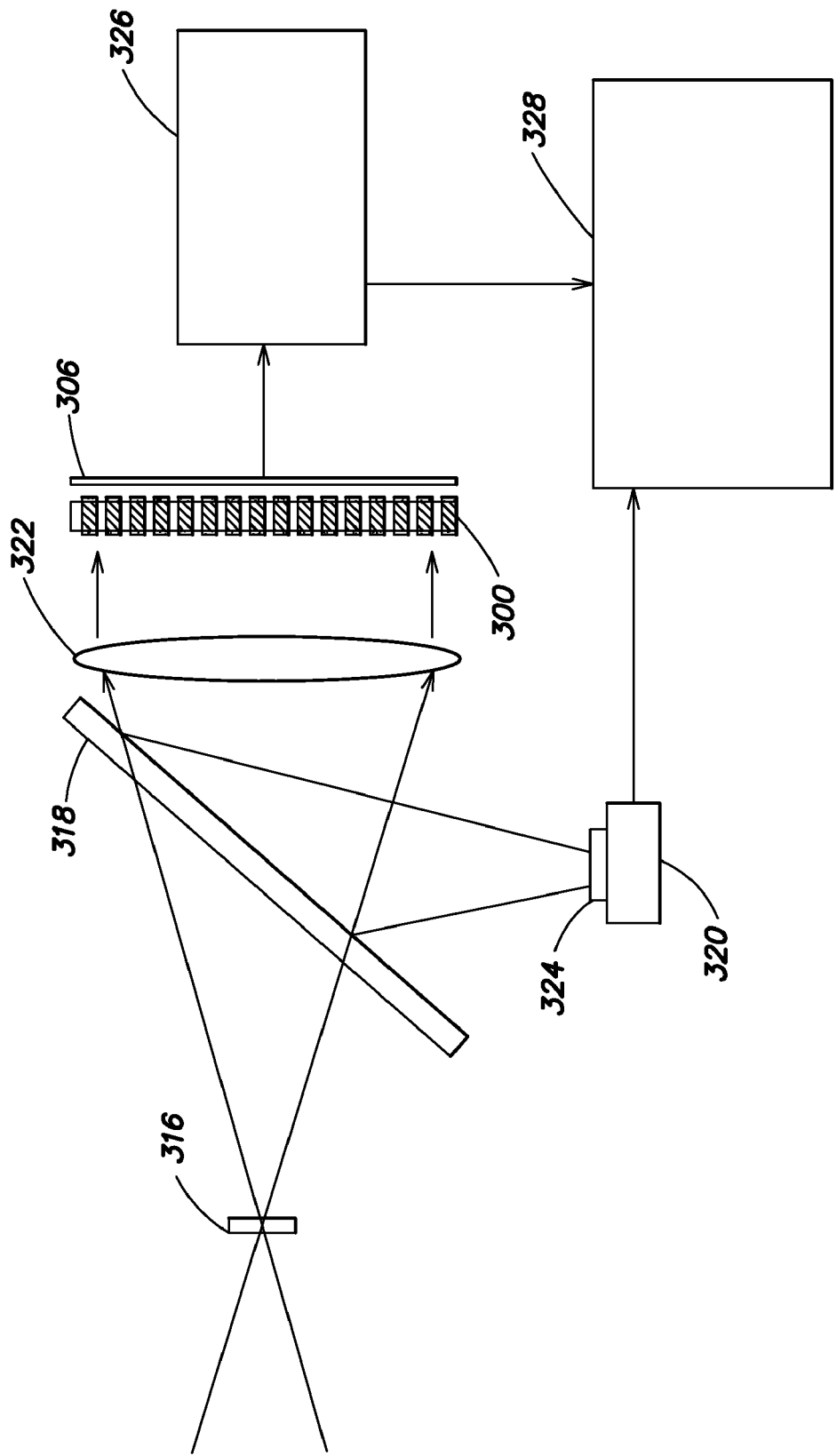
FIG. 5 is a diagram of one example of an interferometer/spectrometer including an adjustable lamellar grating system according to aspects of the invention.

Referring to FIG. 5, there is illustrated one example of a configuration for a lamellar grating interferometer including an adjustable lamellar grating system according to aspects of the invention. In the illustrated example, light incident from the left passes through an input aperture 316 and through a beam splitter 318. The input aperture 316 defines the optical image size in the focal plane so that diffracted light can be excluded from the detector 320. Use of the beam splitter 318 and a lens 322 produces a collimated beam of light normally incident upon the two-dimensional lamellar grating. As discussed above, the adjustable two-dimensional lamellar grating system comprises the dielectric wafer 302 and the movable mirror 306. Interference is between the light passing through the holes 304 (or wells 312) in the dielectric wafer 302, reflecting off the moving mirror 306, and passing back through the holes (or wells) and the light passing through the dielectric wafer, reflecting off the backside of the wafer (for example, off the reflective layer 308) and traveling back through the dielectric wafer. The light coming off the lamellar grating is focused by the lens 322, reflects off the beam splitter 318 and is imaged on the detector 320. In one example, the detector aperture 324 excludes diffracted light from the detector 320. In one example, to operate as an interferometer/spectrometer, the position of the mirror 306 is "scanned" (moved through a range of positions relative to the dielectric wafer) by a mirror-drive unit 326 while the output of the detector 320 is measured by a control and data acquisition module 328. This results in an interferogram produced by the interferometer.

Having thus described several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only.

What is claimed is:

1. An adjustable lamellar grating system comprising:
   a dielectric wafer having a plurality of periodically spaced recesses formed therein;
   a movable mirror aligned substantially parallel with the dielectric wafer; and
   a mechanism for moving the mirror relative to the dielectric wafer;
   wherein the dielectric wafer has a first surface facing the movable mirror and a second, opposing surface; and
   wherein the dielectric wafer has higher reflectivity at the first surface facing the movable mirror than at the second surface.

2. The adjustable lamellar grating system as claimed in claim 1, wherein the plurality of recesses comprises a plurality of through holes extending from the first surface to the second surface.

3. The adjustable lamellar grating system as claimed in claim 1, wherein the plurality of recesses comprises a plurality of wells formed in the first surface.

4. The adjustable lamellar grating system as claimed in claim 1, wherein the dielectric wafer comprises a silicon wafer.

5. The adjustable lamellar grating system as claimed in claim 1, further comprising an anti-reflection coating disposed on the second surface.

6. The adjustable lamellar grating system as claimed in claim 5, further comprising a reflective layer disposed on the first surface.

7. The adjustable lamellar grating system as claimed in claim 6, wherein the reflective layer comprises a metal layer.

8. The adjustable lamellar grating system as claimed in claim 1, wherein the mechanism for moving the mirror relative to the dielectric wafer includes a mirror driver unit configured to move the mirror through a range of positions relative to the dielectric wafer.

9. An interferometer comprising:
   a lamellar grating including a dielectric wafer having a plurality of periodically spaced recesses formed therein;
   a movable mirror aligned substantially parallel with the dielectric wafer;
   an input aperture configured to pass incident light to the lamellar grating;
   a detector configured to receive output light from the lamellar grating; and
   a mirror drive unit configured to move the movable mirror relative to the dielectric wafer.

10. The interferometer as claimed in claim 9, further comprising:
   a beam splitter disposed between the input aperture and the lamellar grating, the beam splitter configured to pass the incident light from the input aperture to the lamellar grating and to reflect the output light from the lamellar grating to the detector.

11. The interferometer as claimed in claim 10, wherein the plurality of recesses comprises a plurality of through holes extending through the dielectric wafer.

12. The interferometer as claimed in claim 10, wherein the plurality of recesses comprises a plurality of wells formed in a surface of the dielectric wafer.

13. The interferometer as claimed in claim 10, wherein the dielectric wafer has higher reflectivity at a first surface facing the movable mirror than at a second, opposing and substantially parallel surface.

14. The interferometer as claimed in claim 13, wherein the dielectric wafer comprises a reflective layer disposed on the first surface.

15. The interferometer as claimed in claim 14, wherein the dielectric wafer comprises an anti-reflection coating disposed on the second surface.

16. The interferometer as claimed in claim 10, further comprising a lens disposed between the beam splitter and the lamellar grating.

17. The interferometer as claimed in claim 9, wherein the mirror drive unit is configured to scan a position of the movable mirror through a range of positions relative to the dielectric wafer; and further comprising:

a control and data acquisition module configured to measure an output from the detector.

18. An interferometer comprising:

a adjustable lamellar grating system including a dielectric wafer having a first surface, a second surface a plurality of periodically spaced holes formed therein between the first surface and the second surface, a movable mirror aligned substantially parallel with the first surface of the dielectric wafer, a reflective layer disposed on the first surface of the dielectric wafer facing the movable mirror, and a mirror drive unit configured to move the movable mirror with respect to the dielectric wafer;

an input aperture;

a beam splitter located between the input aperture and the second surface of the adjustable lamellar grating;

a lens located between the beam splitter and the second surface of the adjustable lamellar grating, the lens and beam splitter configured to direct a collimated beam of light toward the second surface of the adjustable lamellar grating; and a detector;

wherein the interferometer comprises a first optical path and a second optical path;

wherein light traveling on the first optical path passes from the lens toward the second surface and through at least some of the plurality of periodically spaced holes in the dielectric wafer, reflects off the movable mirror, returns toward the first surface and through the at least some of the plurality of periodically spaced holes in the dielectric wafer and the lens, and is reflected off the beam splitter to the detector; and wherein light traveling on the second optical path passes from the lens toward the second surface and through the dielectric wafer, reflects off the reflective layer, returns through the dielectric wafer and the lens, and is reflected off the beam splitter to the detector.

19. An adjustable lamellar grating system comprising:

a movable mirror;

a first dielectric wafer having a first surface, a second surface and a plurality of periodically spaced holes extending from the first surface to the second surface, the first dielectric wafer aligned substantially parallel with the movable mirror with the first surface facing the movable mirror;

a mechanism configured to move the movable mirror relative to the dielectric wafer; and a reflective layer disposed on the first surface of the first dielectric wafer.

20. The adjustable lamellar grating system as claimed in claim 19; further comprising:

a second dielectric wafer bonded to the second surface of the first dielectric wafer.

21. The adjustable lamellar grating system as claimed in claim 20, wherein the second dielectric wafer comprises third and fourth substantially parallel surfaces, the third surface bonded to the second surface of the first dielectric wafer; and further comprising an anti-reflection coating disposed on the fourth surface.

22. The adjustable lamellar grating system as claimed in claim 19, further comprising an anti-reflection coating disposed on the second surface of the first dielectric wafer.

23. The adjustable lamellar grating system as claimed in claim 19, wherein the first dielectric wafer comprises a silicon wafer.

* * * * *